(12) United States Patent
Tamura et al.

(10) Patent No.: US 10,049,105 B2
(45) Date of Patent: Aug. 14, 2018

(54) WORD ALIGNMENT SCORE COMPUTING APPARATUS, WORD ALIGNMENT APPARATUS, AND COMPUTER PROGRAM

(71) Applicant: National Institute of Information and Communications Technology, Tokyo (JP)

(72) Inventors: Akihiro Tamura, Tokyo (JP); Taro Watanabe, Tokyo (JP); Eiichiro Sumita, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 25 days.

(21) Appl. No.: 15/118,703

(22) PCT Filed: Feb. 12, 2015

(86) PCT No.: PCT/JP2015/053825
§ 371 (c)(1),
(2) Date: Aug. 12, 2016

(87) PCT Pub. No.: WO2015/133238
PCT Pub. Date: Sep. 11, 2015

(65) Prior Publication Data
US 2017/0068665 A1   Mar. 9, 2017

(30) Foreign Application Priority Data

Mar. 7, 2014   (JP) .................................. 2014-045012

(51) Int. Cl.
*G06F 17/28* (2006.01)
*G06F 17/27* (2006.01)
(Continued)

(52) U.S. Cl.
CPC ...... *G06F 17/2827* (2013.01); *G06F 17/2818* (2013.01); *G10L 25/30* (2013.01)

(58) Field of Classification Search
None
See application file for complete search history.

(56) References Cited

U.S. PATENT DOCUMENTS 6,411,932 B1 *  6/2002 Molnar ................... G09B 19/04
                                                  704/254
7,249,012 B2 *  7/2007 Moore ................ G06F 17/2818
                                                  704/2

(Continued)

OTHER PUBLICATIONS

International Search report for corresponding International Application No. PCT/JP2015/053825 dated Mar. 10, 2015.

(Continued)

*Primary Examiner* — Marcus T Riley
(74) *Attorney, Agent, or Firm* — Renner Otto Boisselle & Sklar, LLP

(57) ABSTRACT

[Object] An object is to provide an apparatus for attaining highly precise word alignment.
[Solution] The apparatus includes: selecting means receiving a bilingual sentence pair and a word alignment for the bilingual sentence pair, for successively selecting words $f_j$ of a sentence in a first language in a prescribed order; and a recurrent neural network (RNN) 100, computing, for all words of the sentence in the first language, a score 102 representing a probability that a word pair consisting of the word $f_j$ and a word $e_{a\_\{j\}}$ aligned with the word $f_j$ by a word alignment $a_j$ in a second language of the bilingual sentence pair is a correct word pair, and based on this score, for computing a score of the word alignment $a_j$. When computing a score of word pair $(f_j, e_{a\_\{j\}})$, RNN 100 computes a score 102 of the word pair $(f_j, e_{a\_\{j\}})$ based on all word alignments $a_1^{j-1}$ selected by the selecting means prior to the (Continued)

word $f_j$ of the word pair $(f_j, e_{a\_\{j\}})$, of the word alignments $a_j$, by means of a recurrent connection 118.

14 Claims, 7 Drawing Sheets

(51) Int. Cl.
    *G06F 17/20*         (2006.01)
    *G10L 25/30*         (2013.01)

(56) References Cited

U.S. PATENT DOCUMENTS

| | | | | |
|---|---|---|---|---|
| 7,366,654 | B2* | 4/2008 | Moore | G06F 17/28 704/2 |
| 8,185,375 | B1* | 5/2012 | Kumar | G06F 17/2854 704/4 |
| 8,543,563 | B1* | 9/2013 | Nikoulina | G06F 17/2809 704/2 |
| 2004/0002848 | A1* | 1/2004 | Zhou | G06F 17/2827 704/2 |
| 2005/0049851 | A1* | 3/2005 | Watanabe | G06F 17/2827 704/2 |
| 2006/0015321 | A1* | 1/2006 | Moore | G06F 17/2818 704/5 |
| 2017/0068665 | A1* | 3/2017 | Tamura | G06F 17/2818 |

OTHER PUBLICATIONS

Nan Yang et al. "Word Alignment Modeling with Context Dependent Deep Neural Network", Aug. 2013, Proceedings of the 51th Annual Meeting of the Association for Computational Linguistics, pp. 166-175.

Taisuke Sumii et al, "An Attempt to Apply a Recurrent Network to Machine Translation", 2007 Nendo Annual Conference of JSAI (Dai 21 Kai) Ronbunshu [CD-ROM], The Japanese Society for Artificial Intelligence, Jun. 18, 2007 (Jun. 18, 2007), [ISSN]1347-9881, pp. 1-4.

Peter F. Brown et al, "The Mathematics of Statistical Machine Translation: Parameter Estimation", 1993. Association for Computational Linguistics, 19(2): pp. 263-311.

Stephan Vogel et al. "Hmm-based Word Alignment in Statistical Translation", 1996. Proceedings of the 16th International Conference on Computational Linguistics, pp. 836-841.

Chris Dyer et al. "Unsupervised Word Alignment with Arbitrary Features", 2011. In Proceedings of the 49th Annual Meeting of the Association for Computational Linguistics: Human Language Technologies vol. 1, pp. 409-419.

Chooi-Ling Goh et al. "Constraining a Generative Word Alignment Model with Discriminative Output", 2010. IEICE Transactions, 93-D(7):pp. 1976-1983.

Tomas Mikolov et al. "Recurrent Neural Network based Language Model", 2010. In Proceedings of 11th Annual Conference of the International Speech Communication Association, pp. 1045-1048.

Franz Josef Och, "Minimum Error Rate Training in Statistical Machine Translation", 2003. In Proceedings of the 41st Annual Meeting of the Association for Computational Linguistics, pp. 160-167.

* cited by examiner

|  | Train | Dev | Test |
|---|---|---|---|
| BTEC | 9K | 0 | 960 |
| Hansards | 1.1M | 37 | 447 |
| FBIS NIST 03 / NIST 04 | 240K | 878 | 919 / 1,597 |
| IWSLT | 40K | 2,501 | 489 |
| NTCIR | 3.2M | 2,000 | 2,000 |

| ALIGNMENT | *BTEC* | *Hansards* |
|---|---|---|
| *IBM4* | 0.4859 | 0.9029 |
| $FFNN_s(I)$ | 0.4770 | 0.9020 |
| $RNN_s(I)$ | $0.5053^+$ | 0.9068 |
| $RNN_{s+c}(I)$ | $0.5174^+$ | $0.9202^+$ |
| $RNN_u$ | $0.5307^+$ | 0.9037 |
| $RNN_{u+c}$ | $0.5562^+$ | $0.9275^+$ |
| $FFNN_s(R)$ | 0.8224 | - |
| $RNN_s(R)$ | $0.8798^+$ | - |
| $RNN_{s+c}(R)$ | $0.8921^+$ | - |

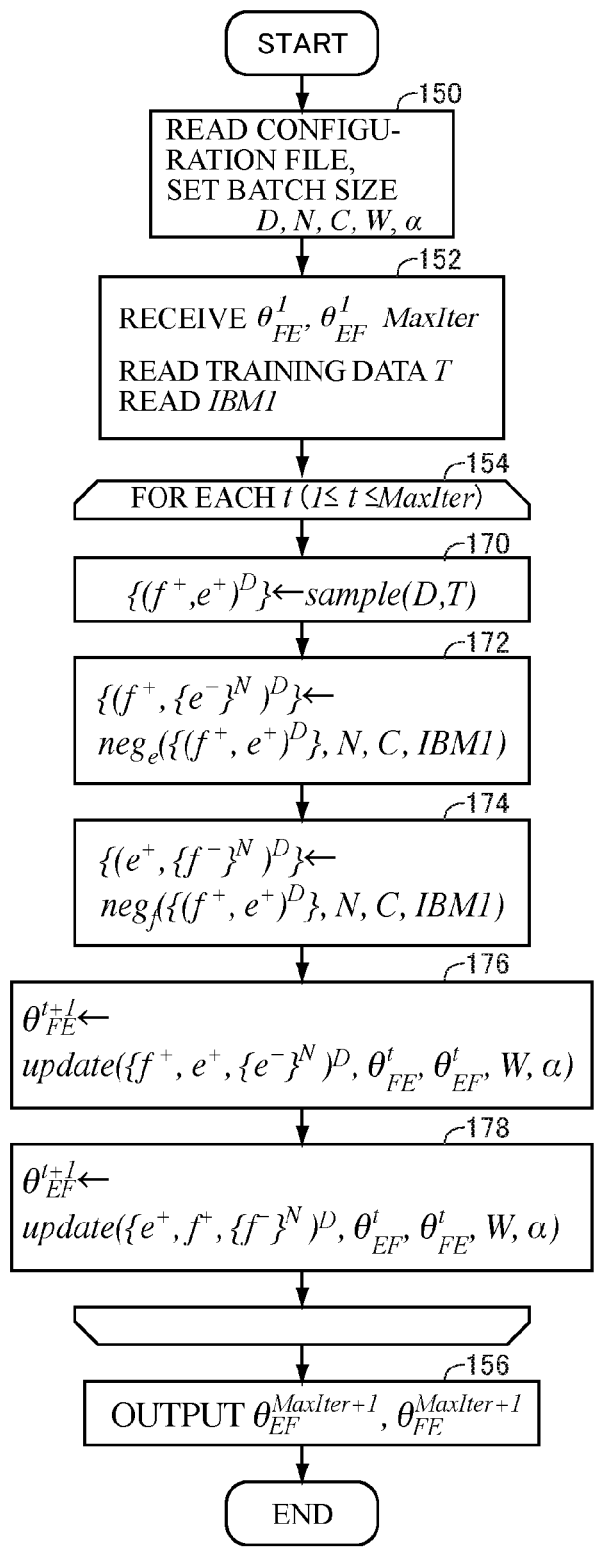

| ALIGNMENT | 40K | 9K | 1K |
|---|---|---|---|
| IBM 4 | 0.5467 | 0.4859 | 0.4128 |
| $RNN_{u+c}$ | 0.6004 | 0.5562 | 0.4842 |
| $RNN_{s+c}$ (R) | - | 0.8921 | 0.6063 |

Fig. 10
| ALIGNMENT | IWSLT | NTCIR | FBIS | |
|---|---|---|---|---|
| | | | NIST 03 | NIST 04 |
| IBM $4_{all}$ | 46.47 | 27.91 | 25.90 | 28.34 |
| IBM 4 | | 27.25 | 25.41 | 27.65 |
| $FFNN_s(I)$ | 46.38 | 27.05 | 25.45 | 27.61 |
| $RNN_s(I)$ | 46.43 | 27.24 | 25.47 | 27.56 |
| $RNN_{s+c}(I)$ | 46.51 | 27.12 | 25.55 | 27.73 |
| $RNN_u$ | 47.05* | 27.79* | 25.76* | 27.91* |
| $RNN_{u+c}$ | 46.97* | 27.76* | 25.84* | 28.20* |
Fig. 11
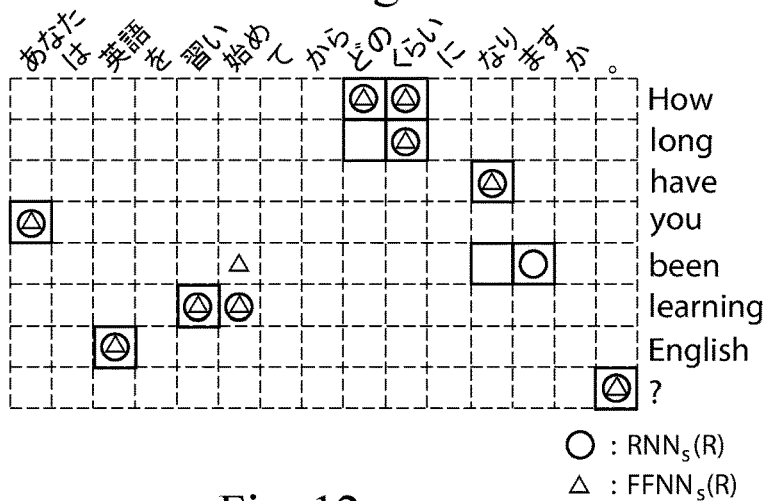
○ : $RNN_s(R)$
△ : $FFNN_s(R)$
Fig. 12
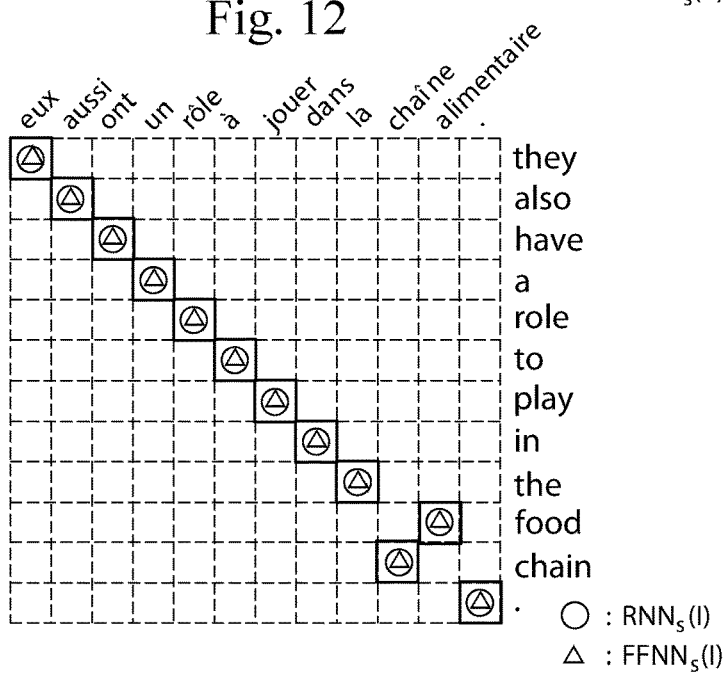
○ : $RNN_s(I)$
△ : $FFNN_s(I)$

WORD ALIGNMENT SCORE COMPUTING APPARATUS, WORD ALIGNMENT APPARATUS, AND COMPUTER PROGRAM

TECHNICAL FIELD

The present invention relates to a word alignment apparatus for analyzing corresponding relation of respective words (word alignment) in a bilingual sentence pair, and to a word alignment score computing apparatus used therefor.

BACKGROUND ART

Word alignment is an essential task indispensable for Statistical Machine Translation (SMT). FIG. 1 shows an example of word alignment.

Referring to FIG. 1, consider a bilingual sentence pair 20 of Japanese and English. Each sentence of bilingual sentence pair 20 is segmented word by word in advance. Bilingual sentence pair 20 includes a Japanese sentence 30 ("watashi|ga|riyou|ryoukin|wo|harau" ("|" represents word segmentation)), and an English sentence 32 ("I pay usage fees."). Word alignment is a process of estimating, for each word forming Japanese sentence 30, for example, a word (or word group) of English sentence 32 into which it is translated, or, which word of Japanese sentence 30 corresponds to which word (or word group) of English sentence 32. While FIG. 1 shows word alignment from Japanese to English, word alignment from English to Japanese is done in the similar manner.

In SMT, such a word alignment plays a very important role. SMT prepares a bilingual corpus including a large number of bilingual pairs such as described above. Word alignment is done for each bilingual pair. Based on the word alignment, a translation model is built through a statistical process. This process is referred to as translation model training. In short, the translation model represents, in the form of probability, which word of one language would be translated to which word of the other language. In SMT, when a sentence of a source language is given, a number of candidate sentences of the translation target language (target language) are prepared; probability of the source language sentence generated from each candidate sentence of target language is computed, and the target language sentences that has the highest probability is estimated to be the translation of the source language. In this process, the translation model mentioned above is used.

Clearly, translation model with higher precision is necessary to improve SMT performance. For this purpose, it is necessary to improve word alignment precision of a bilingual corpus used in translation model training. Therefore, in order to improve SMT performance, it is desired to improve performance of a word alignment apparatus performing word alignment of bilingual pairs.

Prevalently used word alignment methods include IBM model (see Non-Patent Literature 1 below) and HMM model (see Non-Patent Literature 2). These models assume that word alignment is generated in accordance with a certain probability distribution, and estimate (learn) the probability distribution from actually observed word alignment (generation model). Given a source language sentence $f_1^J = f_1, \ldots, f_J$ and a target language sentence $e_1^I = e_1, \ldots, e_I$, the sentence $f_1^J$ of the source language is generated from the sentence $e_1^I$ of the target language via the word alignment $a_1^J$, and the probability of this generation is computed in accordance with Equation (1) below. In Equation (1), each $a_j$ is a hidden variable indicating that the source language word $f_j$ is aligned to the target language word $e_{a\_j}$. In the following texts, an underscore "_" indicates that a certain subscript notation further has a subscript notation, and parentheses "{ }" following the underscore indicate the range of subscripts. Specifically, a notation "$e_{a\_\{j\}}$" indicates that the subscript accompanying "e" is "$a_j$" in normal expression, and the notation "$e_{a\_\{j\}-1}$" indicates that the subscript to "e" is $a_j-1$, and the notation "$e_{a\_\{j-1\}}$" indicates that the subscript to "e" is $a_{j-1}$.

$$p(f_1^J | e_1^I) = \sum_{a_1^J} p(f_1^J, a_1^J | e_1^I) \tag{1}$$

$$p(f_1^J, a_1^J | e_1^I) = \prod_{j=1}^{J} p_a(a_j | a_{j-1}, j) \cdot p_t(f_j | e_{a_j}) \tag{2}$$

In Equation (2), $p_a$ is alignment probability, and $p_t$ is lexical translation probability.

For a bilingual sentence pair $(f_1^J, e_1^I)$, these models specify a best alignment $\hat{a}$ (the symbol "^" is originally to be written immediately above the immediately following character) satisfying Equation (3) below, using, for example, forward-backward algorithm. The best alignment is referred to as Viterbi alignment.

$$\hat{a} = \underset{a_1^J}{\mathrm{argmax}}\, p(f_1^J, a_1^J | e_1^I) \tag{3}$$

Non-Patent Literature 3 proposes a method of alignment in which Context-Dependent Deep Neural Network for HMM, which is one type of Feed Forward Neural Networks (FFNN) is applied to the HMM model of Non-Patent Literature 2, so that the alignment score corresponding to alignment probability and lexical score corresponding to lexical selection probability are computed using FFNN. Specifically, a score $s_{NN}(a_1^J | f_1^J, e_1^I)$ of alignment $a_1^J$ for a bilingual sentence pair $(f_1^J, e_1^I)$ is represented by Equation (4) below.

$$s_{NN}(a_1^J | f_1^J, e_1^I) = \prod_{j=1}^{J} t_a(a_j - a_{j-1} | c(e_{a_{j-1}})) \cdot t_t(f_j, e_{a_j} | c(f_j), c(e_{a_j-1})) \tag{4}$$

In the method of Non-Patent Literature 3, normalization over all words is computationally prohibitively expensive and, therefore, a score is used in place of probability. Here, $t_a$ and $t_t$ correspond to $p_a$ and $p_t$ of Equation (2), respectively. $s_{NN}$ represents a score of alignment $a_1^J$, and $c(w)$ represents context of word w. As in the HMM model, Viterbi alignment is determined by forward-backward algorithm in this model.

FIG. 3 shows a network structure (lexical translation model) of the neural network for computing a lexical translation score $t_t(f_j, e_{a\_\{j\}} | c(f_j), c(e_{a\_\{j\}-1}))$ of Equation (4). A neural network 60 shown in FIG. 3 has: an input layer (Lookup layer) 70 receiving words $f_{j-1}$, $f_j$ and $f_{j+1}$ of the source language and words $e_{a\_\{j\}-1}$, $e_{a\_\{j\}}$ and $e_{a\_\{j\}+1}$ of the target language and converting these to a vector $z_0$; a hidden layer 72 receiving vector $z_0$ and outputting an output vector $z_1$ in accordance with Equation (5); and an output layer 74 receiving vector $z_1$ and computing and outputting a lexical translation score 76 in accordance with Equation (6). These layers have weight matrices L, {H, $B_H$} and {O, $B_O$}, respectively. Though an example having one hidden layer is described here, two or more hidden layers may be used.

Weight matrix L is an embedding matrix that manages word embedding of each word. Word embedding refers to a low dimensional real-valued vector representing syntactic and semantic properties of a word. When we represent a set of source language words by $V_f$, a set of target language words by $V_e$ and the length of word embedding by M, the weight matrix L is a $M \times (|V_f|+|V_e|)$ matrix. It is noted, however, that <unk> representing an unknown word and <null> representing null are added to $V_f$ and $V_e$, respectively.

The lexical translation model receives as inputs the source language word $f_j$ and the target language word $e_{a\_\{j\}}$ as objects of computation, as well as their contextual words. The contextual words refer to words existing in a window of a predetermined size. Here, window width of 3 is assumed, as shown in FIG. 3. Input layer 70 includes a source language input unit 80 and a target language input unit 82. Source language input unit 80 receives the source language word $f_j$ as the object of computation as well as preceding and succeeding two words $f_{j-1}$ and $f_{j+1}$, finds corresponding columns of embedding matrix (L), and outputs source language portion of the word embedding vector. Target language input unit 82 receives the target word $e_{a\_\{j\}}$ as the object of computation as well as preceding and succeeding two words $e_{a\_\{j\}-1}$ and $e_{a\_\{j\}+1}$, finds corresponding columns from embedding matrix (L), and outputs target language portion of the word embedding vector. The output of source language input unit 80 and the output of target language input unit 82 are concatenated to form a real-valued vector $Z_0$, which is supplied to the input of hidden layer 72. Then, hidden layer 72 captures non-linear features of real-valued vector $z_0$ and outputs a vector $z_1$. Finally, output layer 74 receives vector $z_1$ output from hidden layer 72, and computes and outputs a lexical translation score 76 given by the following equation.

$$t_t\left(f_j, e_{a_j} | f_{j-1}^{j+1}, e_{a_j-1}^{a_j+1}\right)$$

Specific computations in hidden layer 72 and output layer 74 are as follows.

$$z_1 = f(H \times z_0 + B_H), \quad (5)$$

$$t_t = O \times z_1 + B_O \quad (6)$$

where H, $B_H$, O and $B_O$ are a $|z_1| \times |Z_0|$, $|z_1| \times 1$, $1 \times |z_1|$ and $1 \times 1$ matrix, respectively. Further, f(x) is a non-linear activation function, and h tan h(x) is used here, which is represented as:

$$h\tanh(x)\begin{cases} = -1 & (x < -1) \\ = 1 & (x > 1) \\ = x & \text{(Otherwise)} \end{cases}$$

The alignment model for computing alignment score $t_a(a_j - a_{j-1} | c(e_{a\_\{j\}-1}))$ can be formed in the same way.

In the training of each model, weight matrices of each layer are trained using Stochastic Gradient Descent (SGD) so that the ranking loss represented by Equation (7) below is minimized. The gradients of weights are computed by back propagation.

$$\text{loss}(\theta) = \sum_{(f,e) \in T} \max\{0, 1 - s_\theta(a^+|f, e) + s_\theta(a^-|f, e)\}. \quad (7)$$

where θ denotes the parameters to be optimized (weights of weight matrices), T is training data, $s_\theta$ denotes the score of $a_1^J$ computed by the model under parameters θ (see Equation (4)), $a^+$ is the correct alignment, and $a^-$ is the incorrect alignment that has the highest score by the model under parameters θ.

CITATION LIST

Non Patent Literature

NPL 1: Peter F. Brown, Stephen A. Della Pietra, Vincent J. Della Pietra, and Robert L. Mercer. 1993. The Mathematics of Statistical Machine Translation: Parameter Estimation. Computational Linguistics, 19(2):263-311.

NPL 2: Stephan Vogel, Hermann Ney, and Christoph Tillmann. 1996. Hmm-based Word Alignment in Statistical Translation. In Proceedings of the 16th International Conference on Computational Linguistics, pages 836-841.

NPL 3: Nan Yang, Shujie Liu, Mu Li, Ming Zhou, and Nenghai Yu. 2013. Word Alignment Modeling with Context Dependent Deep Neural Network. In Proceedings of the 51st Annual Meeting of the Association for Computational Linguistics (Volume 1: Long Papers), pages 166-175.

SUMMARY OF INVENTION

Technical Problem

Both in Equations (2) and (4), alignment $a_j$ of each word depends on immediately preceding alignment $a_{j-1}$. As shown in FIG. 2, when alignment 40 of the first word "watashi" of a Japanese sentence 30 is done and alignment 42 of the next word "ga" is to be done, the result of alignment 40 is referred to. Specifically, in finding best alignment ^a, alignment of each word is determined based on (using as a clue) the immediately preceding alignment relation.

It is not clear, however, if the immediately preceding alignment relation is sufficient as a clue for the alignment. In order to improve precision of word alignment, it may be necessary to figure out other methods and to specify, if any, a method attaining higher precision.

Therefore, an object of the present invention is to provide a word alignment apparatus enabling word alignment with precision higher than the conventional methods, a word alignment score computing apparatus for this purpose, and a computer program therefor.

Solution to Problem

According to a first aspect, the present invention provides a word alignment score computing apparatus that computes a score of word alignment of bilingual sentence pair of first and second languages. The apparatus includes: selecting means receiving the bilingual sentence pair and a word alignment for the bilingual sentence pair, for successively selecting words of a sentence in the first language of the bilingual sentence pair in a prescribed order; and score computing means for computing, for every word of the sentence in the first language of the bilingual sentence pair, a score representing a probability that the word selected by the selecting means and a word in the second language aligned with the word by the word alignment form a correct word pair, and based on this score, for computing a score of the word alignment. In computing a score of a certain word pair, the score computing means computes the score of the certain word pair based on all alignments of words selected by the selecting means preceding that word in the first language which forms the certain word pair.

Preferably, the selecting means includes means for successively selecting words of the sentence in the first language starting from the beginning of the sentence in the first language.

More preferably, the score computing means includes: first computing means for computing a score representing a probability that a word pair consisting of the word selected by the selecting means and a word in a sentence in the second language of the bilingual sentence pair aligned with the word by the word alignment is a correct word pair; and second computing means for computing, based on scores of all words of the sentence in the first language of the bilingual sentence pair computed by the first computing means, the score of the word alignment.

More preferably, the second computing means includes means for computing the score of the word alignment by multiplying the scores of all words of the sentence in the first language of the bilingual sentence pair computed by the first computing means.

The score computing means may include: a recurrent neural network having a first input receiving a word selected by the selecting means and a second input receiving a word in the second language aligned with the word by the word alignment; and input control means for applying the word selected by the selecting means and the word aligned with the word by the word alignment to the first and second inputs, respectively. The recurrent neural network includes: an input layer having the first and second inputs and computing and outputting word embedding vectors from words respectively applied to the first and second inputs; a hidden layer receiving outputs of the input layer, and generating, by a predetermined non-linear operation, a vector representing a relation between two outputs from the input layer; and an output layer computing and outputting the score based on the output of the hidden layer. The output of the hidden layer is applied as an input to the hidden layer when a next word pair is given to the word alignment score computing apparatus.

According to a second aspect, the present invention provides a word alignment apparatus that estimates word alignment of bilingual sentence pair of first and second languages. The apparatus includes: any of the above-described word alignment score computing apparatuses; word alignment candidate generating means for generating a plurality of word alignment candidates for the bilingual sentence pair; computing means for computing, for each of the plurality of word alignment candidates generated by the word alignment candidate generating means, a word alignment score for the bilingual sentence pair using the word alignment score computing apparatus; and word alignment determining means for determining and outputting as the word alignment for the bilingual sentence pair, that one of the word alignment candidates computed by the computing means for the plurality of word alignment candidates which corresponds to the highest score.

According to a third aspect, the present invention provides a computer program causing, when executed by a computer, the computer to function as each means of any of the above-described apparatuses.

BRIEF DESCRIPTION OF DRAWINGS

FIG. 5 is a flowchart representing a control structure of a computer program for training the word alignment model shown in FIG. 4 using a bilingual corpus.

FIG. 10 shows, in the form of a table, translation performance of a statistical machine translation apparatus trained using the word alignment results in accordance with one embodiment of the present invention.

FIG. 11 shows an example of word alignment.

FIG. 12 shows another example of word alignment.

DESCRIPTION OF EMBODIMENTS

Figure 1:
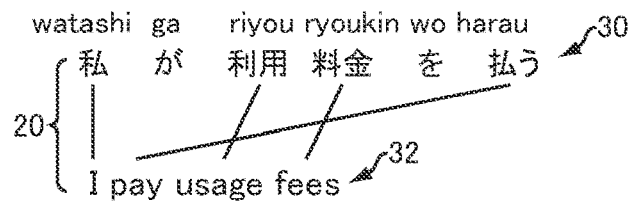
FIG. 1 is a schematic illustration showing a word alignment.
Figure 2:
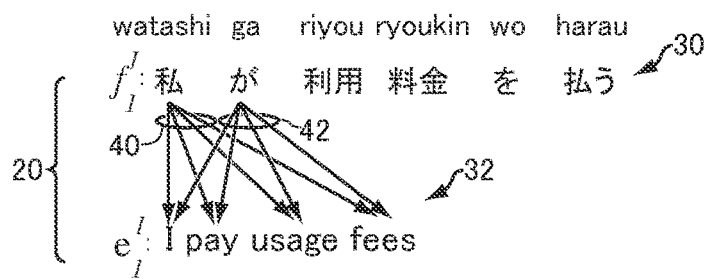
FIG. 2 is a schematic illustration showing a conventional method of word alignment.

In the following description and in the drawings, the same components are denoted by the same reference characters. Therefore, detailed descriptions thereof will not be repeated.

[Basic Concepts]

In the present embodiment, when a best alignment ^a is to be found, alignment of each word is determined based on all alignment relations from the beginning of a sentence to the immediately preceding one. By way of example, a score of alignment sequence $a_1^J = a_1, \ldots, a_J$ is computed in accordance with Equation (8) as a score depending on all preceding alignment relations. The score may be a probability.

$$s_{NN}(a_1^J | f_1^J, e_1^I) = \prod_{j=1}^{J} t_{RNN}(a_j | a_1^{j-1}, f_j, e_{a_j}) \quad (8)$$

First Embodiment

For this purpose, the present embodiment adopts an RNN (Recurrent Neural Network) based alignment model. This model computes a score $s_{NN}$ of alignment $a_1^J$ using Equation (8) by an RNN. According to Equation (8), the estimation of the j-th alignment $a_j$ depends on all the preceding alignments $a_1^{j-1}$. Note that in this example, not a probability but a score is used as in the conventional FFNN type example.

Figures 4, 8, 9:
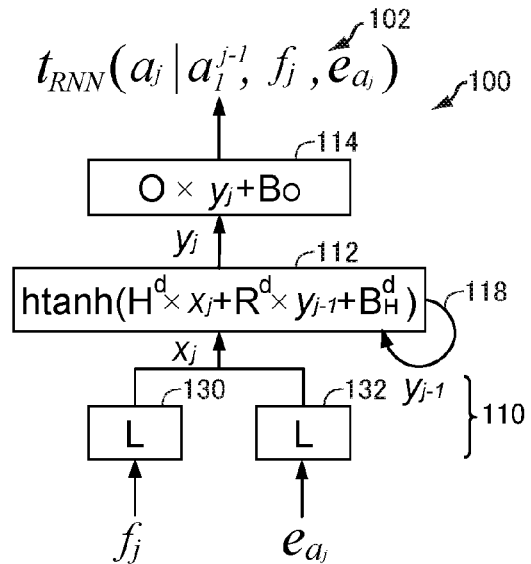
FIG. 4 schematically shows a configuration of a word alignment model using RNN, in accordance with an embodiment of the present invention.
FIG. 8 shows, in the form of a table, sizes of data sets used in experiments.
FIG. 9 shows, in the form of a table, word alignment performances in accordance with one embodiment of the present invention.

FIG. 4 shows a configuration of the RNN-based model 100. Referring to FIG. 4, model 100 includes an input (Lookup) layer 110, a hidden layer 112, and an output layer 114. These have weight matrices L, $\{H^d, R^d, B^d_H\}$ and $\{O, B_O\}$, respectively. The matrices ($H^d, R^d, B^d_H$) in the hidden layer 112 depend on alignment, where d denotes the jump distance from alignment $a_{j-1}$ to alignment $a_j$: $d=a_j-a_{j-1}$. In the experiments as will be described later, jump distances equal to or bigger than 8 and equal to or smaller than −8 are merged to "≥8" distance and "≤−8" distance, respectively. Specifically, hidden layer 112 has weight matrices $\{H^{\leq-8}, H^{-7}, \ldots H^7, H^{8\leq}, R^{\leq-8}, R^{-7}, \ldots, R^7, R^{8\leq}, B_H^{\leq-8}, B_H^{-7}, \ldots, B_H^7, B_H^{8\leq}\}$.

Referring to FIG. 4, input layer 110 includes a source language input unit 130 and a target language input unit 132. Source language input unit 130 receives a source language word $f_j$ as an object of computation, finds a corresponding column in embedding matrix (L), and outputs a source language portion of the word embedding vector. Target language input unit 132 receives a target language word $e_{a\_\{j\}}$ as an object of computation, finds a corresponding column in embedding matrix (L), and outputs a target language portion of the word embedding vector. The outputs from source language input unit 130 and from target language input unit 132 are concatenated and form a real-valued vector $x_j$, which is fed to an input of hidden layer 112. The previous output of hidden layer 112 is temporarily stored, and it is fed to the input of hidden layer 112 as the previous output vector $y_{j-1}$ by a recurrent connection 118. Then, hidden layer 112 captures non-linear characteristics of real-valued vector $x_j$ and output vector $y_{j-1}$, and outputs a vector $y_j$. This vector is temporarily stored and fed to the input of hidden layer 112 through recurrent connection 118 at the time of processing the next word $f_{j+1}$ of the source language. When j=0, vector $y_{j-1}$ is initialized to all 0. It is noted that in the computation in hidden layer 112, weight matrices $\{H^d, R^d, B^d_H\}$ depending on a specific jump distance d are used. Finally, output layer 114 receives the vector $y_j$ output from hidden layer 112, and computes and outputs the score 102 given by the following equation.

$$t_{RNN}(a_j|a_1^{j-1}, f_j, e_{a_j})$$

Figure 3:
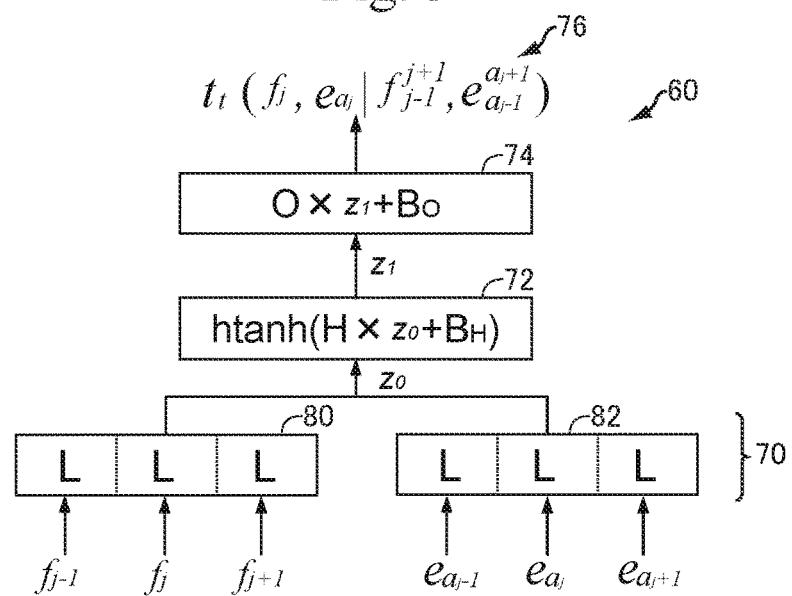
FIG. 3 schematically shows a configuration of a neural network realizing a lexical translation model in accordance with Non-Patent Literature 3.

Upon receiving the vector $y_j$ output from hidden layer 112 and in response to vector $y_j$, output layer 114 computes and outputs score 102 ($t_{RNN}$) of alignment $a_j$ in accordance with Equation (10). Note that while the conventional FFNN-based model (FIG. 3) consists of two components including lexical translation score and alignment score, the RNN-based model in accordance with the present embodiment simply outputs one score 102.

The computations in the hidden layer 112 and output layer 114 of this model are as follows.

$$y_j = f(H^d \times x_j + R^d \times y_{j-1} + B^d_H) \quad (9)$$

$$t_{RNN} = O \times y_j + B_O \quad (10)$$

where $H^d, R^d, B^d_H$, O and $B_o$ are $|y_j| \times |x_j|$, $|y_j| \times |y_{j-1}|$, $|y_j| \times 1$, $1 \times |y_j|$ and $1 \times 1$ matrices, respectively. Note that $|y_j| = |y_{j-1}|$ here. f(x) is a non-linear activation function, which is h tan h(x) in this embodiment.

In the present embodiment, Viterbi alignment is determined by a forward-backward algorithm. Strictly speaking, however, a forward-backward algorithm by dynamic programming cannot be used, since alignment history for $y_j$ is long. Therefore, here, Viterbi alignment is approximated by heuristic beam search. Specifically, in forward algorithm, the states corresponding only to a beam width designated beforehand are maintained and others are discarded.

As described above, the RNN-based model has a hidden layer with recurrent connections. Because of the recurrent connections, the history of previous alignments can be compactly encoded by hidden layer 112 and propagated. Therefore, by computing a score in accordance with the settings of hidden layer 112, a score can be found taking advantage of the entire previous alignment relations.

<Training>

During training, we optimized the weight matrices of respective layers using a mini-batch SGD with a batch size D. This method is faster to converge and more stable than a plain SGC (D=1). Gradients are computed by the Back Propagation Through Time (BPTT) algorithm. In BPTT, the network is unfolded in time direction (j), and then the gradients are computed at each time step. In addition, an l2 regularization term is added to the objective function to prevent the model from over fitting.

The RNN-based model can be trained by the supervised approach as in the FFNN-based model. The training here proceeds based on the ranking loss defined by Equation (7). Other than this method of training, constraints incorporating bi-directional agreement of alignments or unsupervised training may be used to further improve performance. The supervised training requires supervisory data (ideal alignments). To overcome this drawback, the present embodiment adopts unsupervised training using NCE (Noise-Contrastive Estimation), which learns from unlabeled training data.

<Unsupervised Learning>

Dyer et al. proposes an alignment model using unsupervised learning based on Contrastive Estimation (CE) (Chris Dyer, Jonathan Clark, Alon Lavie, and Noah A. Smith. 2011. Unsupervised Word Alignment with Arbitrary Features. In Proceedings of the 49th Annual Meeting of the Association for Computational Linguistics: Human Language Technologies Volume 1, pages 409-419). CE learns a model that discriminates observed data from its neighborhood data, regarding the neighborhood data as pseudo negative samples relative to the observed data. Dyer et al. have regarded all possible word alignments of the bilingual sentences given as training data T as observed data, and regarded the full translation search space Ω as its neighborhood data.

The present embodiment introduced this idea into ranking loss with margin.

$$\mathrm{loss}(\theta) = \max\left\{0, 1 - \sum_{(f^+, e^+) \in T} E_\Phi[s_\theta(a|f^+, e^+)] + \sum_{(f^+, e^-) \in \Omega} E_\Phi[s_\theta(a|f^+, e^-)]\right\} \quad (11)$$

where Φ is a set of all possible alignments given (f, e), $E_\Phi[s_\theta]$ is the expected value of the score $s_\theta$ on Φ, $e^+$ denotes a target language sentence in the training data, and $e^-$ denotes a pseudo target language sentence. The first term of the expected value is for the observed data and the second is for the neighborhood data.

The computation for the full search space Ω is prohibitively expensive. To reduce the computation, we adopted NCE. NCE uses randomly-sampled sentences from full search space Ω as e⁻. Further, it computes the expected values by a beam search with a beam width W and truncates alignments with low scores, to further reduce the computational burden. Then, Equation (11) above is converted to a form suitable for on-line processing.

$$\text{loss}(\theta) = \sum_{(f^+, e^+) \in T} \max \left\{ 0, 1 - E_{GEN}[s_\theta(a|f^+, e^+)] + \frac{1}{N} \sum_{e^-} E_{GEN}[s_\theta(a|f^+, e^-)] \right\} \quad (12)$$

where $e^+$ is a target language sentence forming a pair of $f^+$ in the training data, or $(f^+, e^+) \in T$, $e^-$ is a randomly-sampled pseudo target language sentence whose length is $|e^+|$, and N denotes the number of pseudo target language sentences generated for $f^+$. GEN is a subset of all possible alignment set Φ generated by beam search.

In a simple method of generating $e^-$, $e^-$ is generated by repeating a random sampling of target words from a set $V_e$ of target language words $|e^+|$ times and lining them up. To produce more effective negative samples through model learning, this method samples each word from a set of words whose probability is determined to be above a threshold C under the IBM model 1 incorporating l0 prior (translation candidate words) among a set of target language words that co-occur with source language words $f_i \in f^+$ in the bilingual sentences in the training data. IBM model 1 incorporating l0 prior is convenient for reducing the number of translation candidates because it generates more sparse alignments than the standard IBM model 1.

<Agreement Constraints>

Both of the FFNN and RNN-based models are based on the HMM alignment model and, therefore, they are asymmetric. Specifically, they can represent one-to-many alignment relations when viewed from the target language side. Asymmetric models as these are usually trained in two alignment directions. It has been found, however, that when such directional models are trained to agree with each other, alignment performance improves. Such a constraint is referred to as agreement constraint. In the following, a method of training introducing the agreement constraint to the above-described model will be described.

Specifically, the agreement constraint enforces agreement in word embeddings of both directions. The present embodiment trains two-directional models based on the following objective functions incorporating penalty terms that express a difference between word embeddings.

$$\underset{\theta_{FE}}{\operatorname{argmin}} \{\text{loss}(\theta_{FE}) + \alpha \|\theta_{L_{EF}} - \theta_{L_{FE}}\|\} \quad (13)$$

$$\underset{\theta_{EF}}{\operatorname{argmin}} \{\text{loss}(\theta_{EF}) + \alpha \|\theta_{L_{FE}} - \theta_{L_{EF}}\|\} \quad (14)$$

where $\theta_{FE}$ ($\theta_{EF}$) denotes weights of layers in a source-to-target (target-to-source) alignment model, $\theta_L$ denotes weights of the input layer (Lookup layer), that is, word embeddings, and α is a parameter controlling strength of the agreement constraint. "$\|\theta\|$" indicates the norm. In the experiments described below, 2-norm was used. Equations (13) and (14) can be applied to both supervised and unsupervised approaches. Namely, Equations (7) or (12) may be substituted for loss (θ) of Equations (13) and (14).

Referring to FIG. 5, a program realizing the training of the present embodiment has such a control structure as described in the following. It is noted that the word alignment model training apparatus and the word alignment apparatus in accordance with the present embodiment are generally and practically implemented by computer hardware and a computer program or programs executed by the computer hardware, as will be described later. These may be realized, however, by dedicated hardware, or may be realized by programmable logic devices.

First, the program reads a configuration file having parameters written beforehand, and sets batch size D, N, C, W and α (steps 150). Thereafter, inputs of $\theta^1_{FE}$, $\theta^1_{EF}$ and a constant MaxIter indicating the number of maximum iteration are received, and training data T and IBM1 are read (step 152). Here, IBM1 is a list of translation candidate words found by IBM model 1 incorporating l0 prior for each of source and target language words. The program further includes a step 154, following the steps above, of repeating the following process on every t that satisfies the relation 1≤t≤MaxIter, and a step 156 of outputting values $\theta_{EF}^{MaxIter+1}$ and $\theta_{FE}^{MaxIter+1}$ obtained at the completion of step 154 and ending the process.

The process iterated on every t at step 154 includes: a step 170 of sampling D bilingual sentence pairs $(f^+, e^+)^D$ from training data T; a step 172 of generating N pseudo negative samples for each $f^+$, based on translation candidates (IBM1) of each word in $f^+$ found by IBM model 1 incorporating l0 prior; and a step 174 of generating N pseudo negative samples for each $e^+$, based on translation candidates of each word in $e^+$ through similar processing. Further, at steps 176 and 178, weights of respective layers of the neural network are updated in accordance with the objective functions described above. $\theta^t_{EF}$ and $\theta^t_{FE}$ are simultaneously updated at each iteration, and when $\theta^t_{FE}$ and $\theta^t_{EF}$ are to be updated, values of $\theta^{t-1}_{EF}$ and $\theta^{t-1}_{FE}$ are used to have word embeddings agree (match) with each other.

Figure 6:
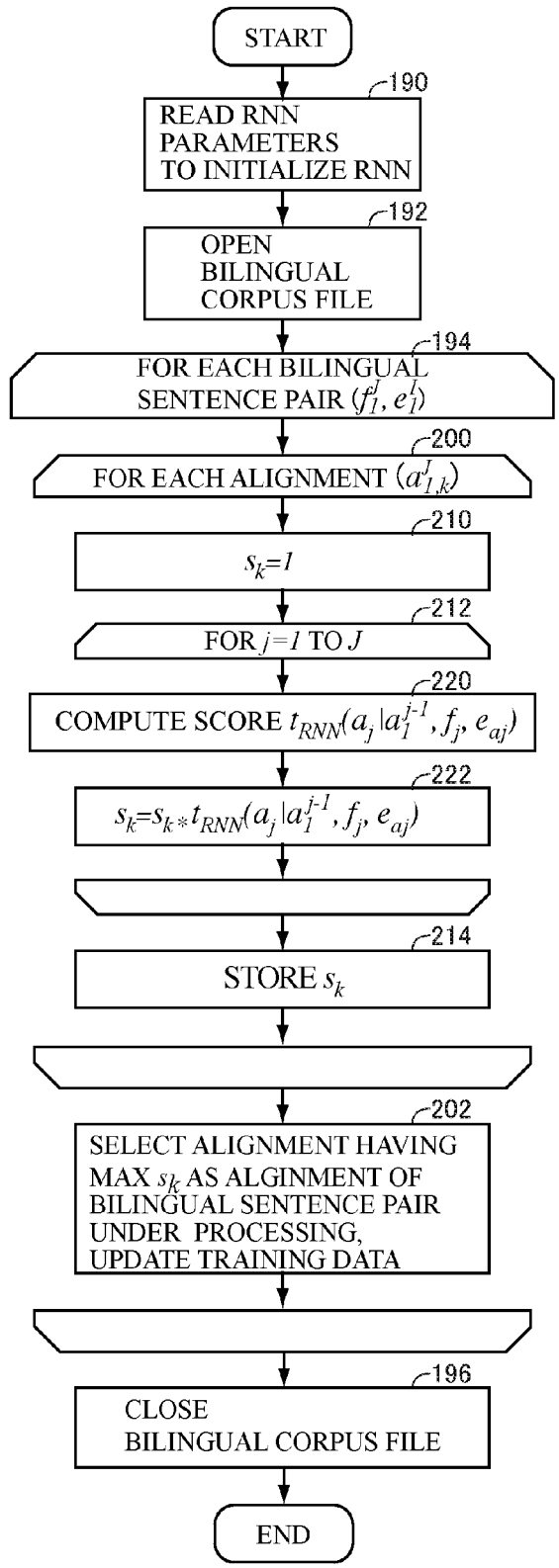
FIG. 6 is a flowchart representing a control structure of a computer program for word alignment of bilingual pairs in a corpus, using the word alignment model shown in FIG. 4.

FIG. 6 shows a control structure of a computer program executing word alignment of bilingual corpus using the RNN-based model. This can add word alignment to training data (bilingual corpus) used for training a statistical machine translator, for example. Referring to FIG. 6, the program includes a step 190 of reading trained parameters of RNN-based model to initialize RNN; a step 192 of opening the bilingual corpus; a step 194 of executing word alignment on every bilingual sentence pair $(f_1^J, e_1^I)$; and a step 196 of closing a training data file in which word alignment is completed on every bilingual sentence pair at step 194 and ending the process.

Step 194 includes: a step 200 of computing and storing a score $s_k$, which will be described later, for all possible alignments $(a_1^J, k)$ (k=1~K) for the bilingual sentence pair $(f_1^J, e_1^I)$ under processing; and a step 202 of selecting, as an alignment for the bilingual sentence pair under processing, the alignment having the maximum score $s_k$ stored at step 200 among all the alignments $(a_1^J, k)$ (k=1~K), labeling the bilingual sentence pair and updating the training data.

Step 200 includes: a step 210 of initializing the score $s_k$ to 1; a step 212 of updating the score $s_k$ taking advantage of the entire previous alignment results $(a_1^{j-1})$ for a word $f_j$ and a word $e_{a_{\{j\}}}$ aligned to the word $f_j$ by alignment $a_j$ for each j, by selecting the source language word $f_j$ while successively changing the variable j from j=1 to J, and thereby computing the final score $s_k$; and a step 214 of storing the score $s_k$ computed at step 212 as the score for the k-th alignment.

Step 212 includes: a step 220 of computing score $t_{RNN}$ ($a_j | a_1^{j-1}, f_j, e_{a\_\{j\}}$); and a step 222 of updating the score $s_k$ by multiplying the score $s_k$ by the score $t_{RNN}$.

Second Embodiment

The first embodiment is directed to an RNN-based model imposing two-directional agreement constraints. The present invention, however, is not limited to such a model having agreement constraints. A one-directional RNN model without agreement constraints may be used.

Figures 7, 13:
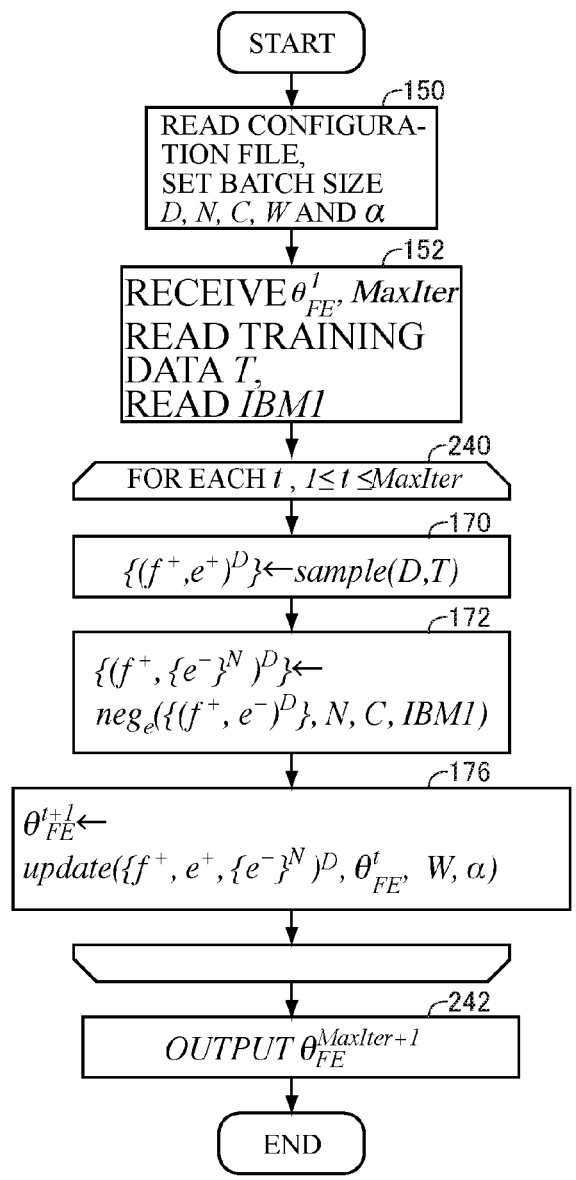
FIG. 7 is a flowchart representing a control structure of a computer program for one-directional training of the word alignment model shown in FIG. 4, using a bilingual corpus.
FIG. 13 shows, in the form of a table, word alignment performances for a BTEC corpus, trained using training data of various sizes.

FIG. 7 shows a control structure of a computer program realizing model training used in the second embodiment. The program shown in FIG. 7 includes, in place of steps 154 and 156 shown in FIG. 5, steps 240 and 242. Step 240 is substantially the step 154 of FIG. 5 with steps 174 and 178 omitted, whereby only one of the two variables is computed. Step 242 is different from step 156 only in that, of the two variables output at steps 156 of FIG. 5, only the value of one variable computed at step 240 is output.

At steps 176 and 178 of FIG. 5, respective weights are updated using Equations (13) and (14) as objective functions, respectively, while at step 176 of FIG. 7, Equation (7) or (12) is used as the objective function. In FIG. 7, processes executed at other steps are the same as those executed at steps shown in FIG. 5, respectively.

[Experiments]

We conducted experiments to evaluate performances of the word alignment methods described in the embodiments above. In the experiments, the Japanese-English word alignment on corpus BTEC (Toshiyuki Takezawa, Eiichiro Sumita, Fumiaki Sugaya, Hirofumi Yamamoto, and Seiichi Yamamoto. 2002. Toward a Broad-coverage Bilingual Corpus for Speech Translation of Travel Conversations in the Real World. In Proceedings of the 3rd International Conference on Language Resources and Evaluation, pages 147-152.) and the French-English word alignment on the Hansards data set used in 2003 NAACL shared task (Rada Mihalcea and Ted Pedersen. 2003. An Evaluation Exercise for Word Alignment. In Proceedings of the HLT-NAACL 2003 Workshop on Building and Using Parallel Texts: Data Driven Machine Translation and Beyond, pages 1-10) were conducted. In addition, we evaluated performances of the translation task from Chinese to English on the FBIS corpus, the IWSLT 2007 translation task from Japanese to English, and the NTCIR Japanese-to-English patent translation task.

FIG. 8 shows the sizes of data sets used. Development sets were not used for BTEC and Hansards, because hyper parameters for the alignment tasks were set through preliminary experiments. The BTEC data is the first 9,960 bilingual sentence pairs in the training data of IWSLT, which were annotated with correct word alignment by Goh et al. (Chooi-Ling Goh, Taro Watanabe, Hirofumi Yamamoto, and Eiichiro Sumita. 2010. Constraining a Generative Word Alignment Model with Discriminative Output. IEICE Transactions, 93-D(7): 1976-1983.) We split them into two: the first 9000 sentence pairs as training data; and the last 960 sentence pairs as test data. While all the data in BTEC is word-aligned, the training data in Hansards is unlabeled. As to FBIS, we used the NIST02 evaluation data as the development data and the NIST03 and 04 evaluation data as test data.

<Comparison>

We compared the RNN-based alignment models in accordance with the embodiments above with two baseline models. The first is the IBM model 4, and the second is an FFNN-based model having one hidden layer. The IBM model 4 was trained by the model sequence ($1^5H^53^54^5$: five iterations of the IBM model 1, followed by five iterations of the HMM model and so on), which is the default setting for GIZA++ (IBM 4), presented by Och and Ney (Franz Josef Och and Hermann Ney. 2003. A Systematic Comparison of Various Statistical Alignment Models. Computational Linguistics, 29:19-51.). For the FFNN-based model, word embedding length M was set to 30, the number of units of a hidden layer $|z_1|$ to 100, and the window width to 5, respectively. Following teachings of Yang et al., (Nan Yang, Shujie Liu, Mu Li, Ming Zhou, and Nenghai Yu. 2013. Word Alignment Modeling with Context Dependent Deep Neural Network. In Proceedings of the 51st Annual Meeting of the Association for Computational Linguistics (Volume 1: Long Papers), pages 166-175), the FFNN-based model was trained by the supervised approach described above.

For the RNN-based models, word embedding length M was set to 30, and the number of units of a hidden layer $|y_i|$ to 100, respectively. In evaluation experiments, four RNN-based models, that is, $RNN_s$, $RNN_{s+c}$, $RNN_u$ and $RNN_{u+c}$ were evaluated. Here, "s/u" denotes a supervised/unsupervised model and "+c" indicates whether the agreement constraint is imposed or not.

In training the models except IBM4, the weights of each layer are first initialized. Specifically, for the weights of the input layer (Lookup layer) L, we preliminarily trained word embeddings both for the source and target languages from each side of the training data, and then set L to the obtained word embeddings. This is to avoid falling into local minima. Other weights are set to random values in the closed interval [−0.1, 0.1]. For the word embedding training, RNNLM tool kit (http://www.fit.vutbr.cz/~imikolov/) based on Mikolov (Tomas Mikolov, Martin Karafiat, Lukas Burget, Jan Cernocky, and Sanjeev Khudanpur. 2010. Recurrent Neural Network based Language Model. In Proceedings of 11th Annual Conference of the International Speech Communication Association, pages 1045-1048) was used with default settings. It is noted, however, that all words that occurred less than five times were all collected to the special token <unk>. Next, each weight was optimized using the mini batch SGD. The batch size D was set to 100, learning rate to 0.01 and l2 regularization parameter to 0.1. The training was stopped after iterations of 50 epochs. Other parameters were as follows. Parameters W, N and C in unsupervised training were set to 100, 50 and 0.001, respectively. The parameter α indicating the strength of agreement constraint was set to 0.1.

In the translation tasks, we used phrase-based SMT of Koehn et al. (Philipp Koehn, Hieu Hoang, Alexandra Birch, Chris Callison-Burch, Marcello Federico, Nicola Bertoldi, Brooke Cowan, Wade Shen, Christine Moran, Richard Zens, Chris Dyer, Ondrej Bojar, Alexandra Constrantin, and Evan Herbst. 2007. Moses: Open Source Toolkit for Statistical Machine Translation. In Proceedings of the 45th Annual Meeting of the Association for Computational Linguistics on Interactive Poster and Demonstration Sessions, pages 177-180). All the Japanese and Chinese sentences were segmented by Chasen and the Stanford segmenter, respectively. In the training, long sentences over 40 words were filtered out. Using the SRILM tool kits (Stolcke, 2002) with modified Kneser-Ney smoothing, 5-gram language model was trained on the English side of each training data for IWSLT and NTCIR, and 5-gram language model was trained on the Xinhua side of English Gigaword Corpus for FBIS. The SMT weight parameters were tuned by MERT (Franz Josef Och. 2003. Minimum Error Rate Training in Statistical Machine Translation. In Proceedings of the 41st Annual Meeting of the Association for Computational Linguistics, pages 160-167), using the development data.

<Word Alignment Results>

FIG. 9 shows word alignment performances evaluated by F-value. In the following description, MODEL (R) and MODEL (I) denote the model trained from correct alignment, and trained using the word alignment by IBM4 as supervisory data, respectively. In Hansards, all models were trained from 100K data randomly sampled from the training data. We evaluated the word alignments produced by first applying each model in both directions, analyzing the alignments in each direction, and then combining the alignments using "grow-diag-final-and" heuristic (Philipp Koehn, Franz Josef Och, and Daniel Marcu. 2003. Statistical Phrase-Based Translation. In Proceedings of the 2003 Human Language Technology Conference: North American Chapter of the Association for Computational Linguistics, pages 48-54). The significance test on word alignment performance was performed by the sign-test with a 5% significance level. In FIG. 9, "+" indicates that the comparisons are significantly different over the baselines (IBM4 and $FFNN_s(R/I)$).

In FIG. 9, $RNN_{u+c}$ includes all characteristics of the embodiments described above. Specifically, the RNN-based model, the unsupervised training and the agreement constraint are all applied. The $RNN_{u+c}$ achieved the highest performance both in BTEC and Hansards. Particularly, the differences from the baseline systems were statistically significant. FIG. 9 also shows that $RNN_s(R/I)$ demonstrated statistically significant difference over $FFNN_s(R/I)$. From these results, we can see that performance can be improved by performing word alignment with RNN-based model considering results of not only the immediately preceding alignment but also other past alignment results.

In FIG. 9, $RNN_{s+c}$ (R/I) and $RNN_{u+c}$ achieved better performance than $RNN_s(R/I)$ and $RNN_u$, respectively, in all tasks. From these results, it can be seen that agreement constraint is effective to improve model performance.

In BTEC, $RNN_u$ and $RNN_{u+c}$ significantly outperformed $RNN_s(I)$ and $RNN_{s+c}$ (I), respectively, while these performances were comparable in Hansards. This indicates that the unsupervised training of the embodiments above is effective when the precision of training data is low, for example, when the results of automatic alignment of training data were used as supervisory data.

<Machine Translation Results>

FIG. 10 shows the translation precision measured by case-sensitive BLEU metric (Kishore Papineni, Salim Roukos, Todd Ward, and Wei-Jing Zhu. 2002. BLEU: a Method for Automatic Evaluation of Machine Translation. In Proceedings of 40th Annual Meeting of the Association for Computational Linguistics, pages 311-318). The values are arithmetic averages of BLEU metrics of three different MERT runs.

In NTCIR and FBIS, each alignment model was trained from the randomly sampled 100K data, and then a translation model was trained from all the training data word-aligned using the alignment model. In addition, the SMT system by IBM4 model ($IBM4_{all}$) trained using all the training data was evaluated. The significance test on translation performance was performed by the boot strap method (Philipp Koehn. 2004. Statistical Significance Tests for Machine Translation Evaluation. In Proceedings of the 2004 Conference on Empirical Methods in Natural Language Processing, pages 388-395) with a 5% significance level. In FIG. 10, "*" indicates that the translation performance had significant difference over the two baselines, IBM4 and $FFNN_s(I)$.

From the results of FIG. 10, it can be seen that $RNN_u$ and $RNN_{u+c}$ outperform $FFNN_s(I)$ and IBM4 in all tasks. Therefore, it can be seen that translation performance is improved by training a translation model using the training data word-aligned using the RNN-based model. In addition, from FIG. 10, it can be seen that in NTCIR and FBIS tasks, the RNN-based models achieve performances comparable to $IBM4_{all}$, though the models were trained from a small part of the training data.

FIG. 11 shows results of word alignment for bilingual sentence pair of Japanese and English by $RNN_s(R)$ and $FFNN_s(R)$ and the correct alignment, by circles, triangles and solid squares, respectively. FIG. 11 shows that $RNN_s(R)$ model almost correctly achieved complicated alignment with two words with long distances, while $FFNN_s(R)$ could not satisfactorily achieve alignment of distant two words. This is because $FFNN_s(R)$ employs only the immediately preceding alignment while $RNN_s(R)$ uses not only the immediately preceding but also other preceding alignment results, that is, in a sense it performs a phrase-level alignment.

FIG. 12 shows results of word alignment for bilingual sentence pair of French and English by $RNN_s(I)$ and by $FFNN_s(I)$. Since English and French have similar word orders, the immediately preceding alignment results provide helpful clue for word alignment and hence, high alignment precision could be achieved even by $FFNN_s(I)$. Therefore, use of $RNN_s(I)$ may have less effect on such a language pair.

<Training Data Size>

FIG. 13 shows results (F values) of word alignment on BTEC of respective models trained with various data sizes. The training data were: the training data for IWSLT (40K); the training data for BTEC (9K); and the training data (1K) randomly sampled from the training data for BTEC. Note that $RNN_{s+c}(R)$ could not be trained using the data for IWSLT (40K), because IWSLT does not have the correct alignment data.

According to FIG. 13, the RNN-based model in accordance with the embodiments above outperformed the IBM model 4 trained from the 40K unlabeled data, when trained either from 1K labeled data or 9K unlabeled data. In other words, the RNN-based model shows better performance than IBM model 4 when trained from less than 25% of the training data for IBM model 4. Therefore, the SMT using an RNNu+c model trained from a small amount of training data can achieve performance comparable to or higher than the SMT based on IBM4 model trained from the entire training data a shown in FIG. 10.

As described above, by using an RNN-based model in accordance with the embodiments above, not only the result of immediately preceding word alignment but also long history of past word alignments can be used for word alignment. As a result, as appears by the experiments, the word alignment using this model outperforms the conventional model depending only on the immediately preceding word alignment. Further, this model can be trained unsupervised, with the resulting model having high performance. In addition, performance comparable to or higher than the conventional model can be achieved even when training data necessary for training is of a small size.

[Computer Implementation]

The word alignment model training apparatus and the word alignment apparatus can substantially be implemented by computer hardware and computer software cooperating with the computer hardware.

<Software Configuration>

The software configuration is as shown in FIGS. 5, 6 and 7.

<Hardware Configuration>

Figure 14:
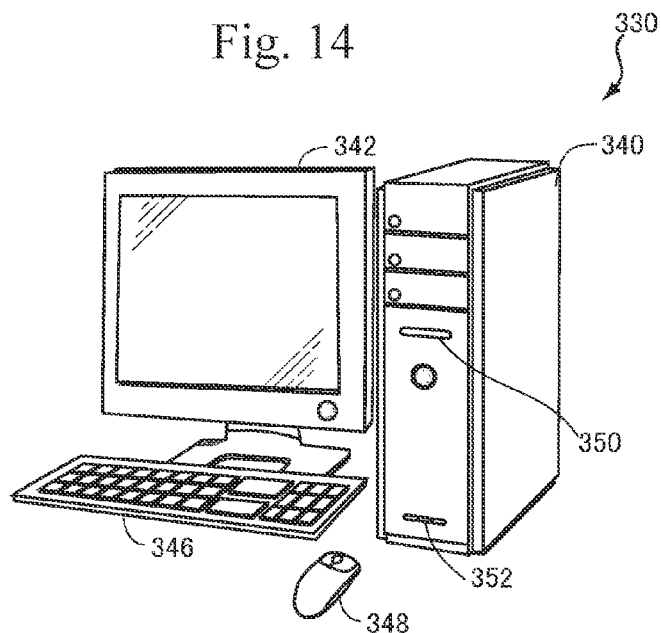
FIG. 14 shows an appearance of a computer realizing the word alignment apparatus in accordance with one embodiment of the present invention.

FIG. 14 shows an appearance of a computer system 330 including a computer 340 realizing the word alignment model training apparatus and the word alignment apparatus described above, and FIG. 15 shows an internal configuration of computer 340.

Referring to FIG. 14, computer system 330 includes computer 340, and a monitor 342, a keyboard 346 and a mouse 348 connected to computer 340. Computer 340 includes a DVD drive 350 to which a DVD 362 (see FIG. 15) can be attached, and a memory port 352 to which a removable memory 364 (see FIG. 15) can be attached.

Figure 15:
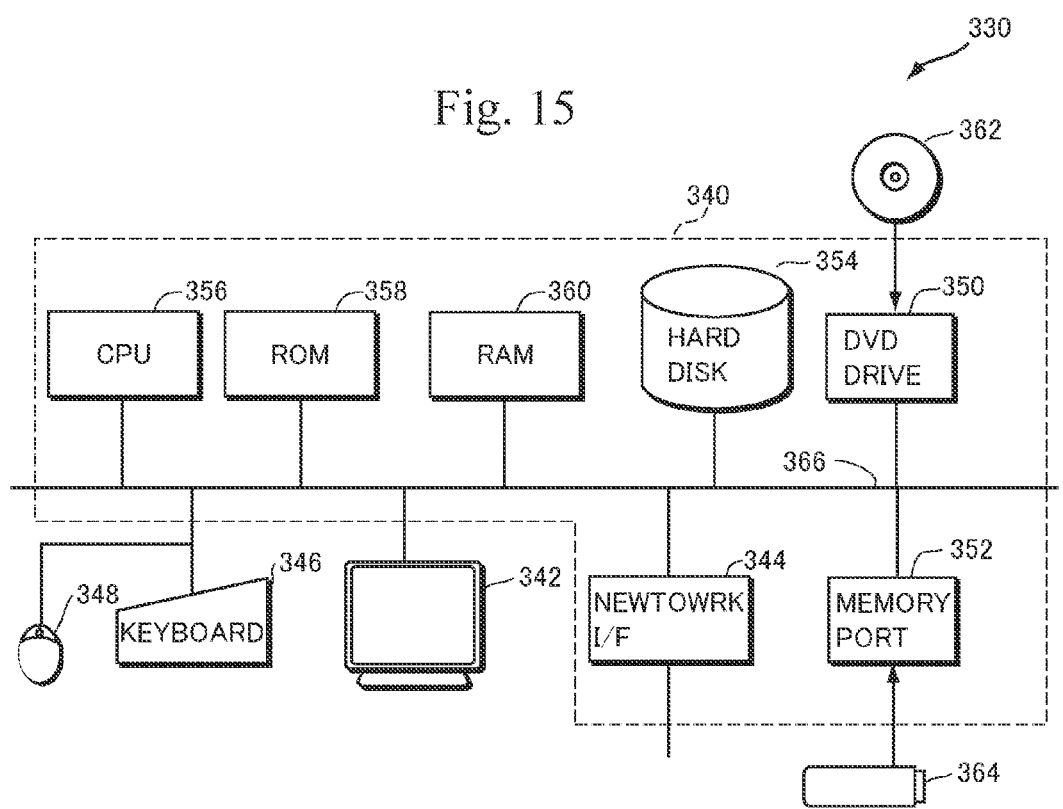
FIG. 15 is a block diagram showing an internal configuration of the computer shown in FIG. 14.

Referring to FIG. 15, in addition to DVD drive 350 and memory port 352, computer 340 includes: a CPU (Central Processing Unit) 356; a bus 366 connected to CPU 356; a re-writable read only memory (ROM) 358 storing a boot-up program and the like; a random access memory (RAM) 360 storing program instructions, a system program and work data; a hard disk drive (HDD) 354 storing computer programs and bilingual corpus; and a network interface (I/F) 344 enabling communication with other terminals.

A computer program causing computer system 330 to function as the word alignment model training apparatus and the word alignment apparatus in accordance with the above-described embodiments is stored in advance in a removable memory 364. After the removable memory 364 is attached to memory port 352 and a rewriting program of ROM 358 is activated, the program is transferred to and stored in ROM 358 or HDD 354. Alternatively, the program may be transferred to RAM 360 from another device on a network by communication through network I/F 344 and then written to ROM 358 or HDD 354. At the time of execution, the program is read from ROM 358 or HDD 354 and loaded to RAM 360 and executed by CPU 356.

The program stored in ROM 358 or HDD 354 includes a sequence of instructions including a plurality of instructions causing computer 340 to function as various functional units of the word alignment model training apparatus and the word alignment apparatus in accordance with the above-described embodiments. Some of the basic functions necessary to realize the operation may be dynamically provided at the time of execution by the operating system (OS) running on computer 340, by a third party program, or by various programming tool kits or a program library installed in computer 340. Therefore, the program may not necessarily include all of the functions necessary to realize the word alignment model training apparatus and the word alignment apparatus in accordance with the above-described embodiments. The program has only to include instructions to realize the functions of the above-described system by dynamically calling appropriate functions or appropriate program tools in a program tool kit from storage devices in computer 340 in a manner controlled to attain desired results. Naturally, the program only may provide all the necessary functions.

The operation of computer system 330 executing a computer program is well known and, therefore, description thereof will not be given here.

In the embodiments above, first, words are successively selected from the beginning of an English sentence, and score of each alignment is computed in accordance with the alignment. The present invention, however, is not limited to such embodiments. The order of selecting words may be arbitrary, and any order may be used provided that all words can be selected in a prescribed order. It is noted, however, that alignment between one language and the other language word by word starting from the beginning of a sentence of the one language as in the embodiments above is the simplest.

Further, in the embodiments above, a specific function is used as a function for each layer of the recurrent type neural network. The present invention, however, is not limited to such embodiments. By way of example, any function that can express non-linear relation between two words may be used in a hidden layer. The same applies to the input layer and the output layer. In addition, though the output from neural network is a score in the embodiments above, it may be a probability of two words being in a correct corresponding relation as described above. Probability can be regarded as a type of score.

In the embodiments above, training of RNN-based neural network and word alignment are executed by the same computer. The present invention, however, is naturally not limited to such embodiments. By copying neural network parameters obtained by training to another computer and setting up the RNN-based neural network, word alignment can be executed by any computer.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention can be used for specifying corresponding words in two sentences, for example, two sentences of different languages. Typically, the present invention can be used for forming training data for a translation model for statistical machine translation, a translation verifying apparatus for a translator and a translation proof reader, an apparatus for comparing two documents, and so on.

REFERENCE SIGNS LIST 20 bilingual sentence pair
30 Japanese sentence
32 English sentence
40, 42 alignment
60 neural network
70, 110 input layer (Lookup layer)
72, 112 hidden layer
74, 114 output layer
76 lexical translation score
80, 130 source language input unit
82, 132 target language input unit
100 RNN-based model
102 score
118 recurrent connection

The invention claimed is:

1. A word alignment score computing apparatus for computing a score of word alignment of a bilingual sentence pair of first and second languages, comprising a processor configured to:

responsive to said bilingual sentence pair and a word alignment for the bilingual sentence pair, successively select words of a sentence in said first language of said bilingual sentence pair in a prescribed order; and compute, for every word of the sentence in said first language of said bilingual sentence pair, a score representing a probability of the selected word and a word in said second language aligned with said word by said word alignment forming a correct word pair, and based on this score, for computing a score of said word alignment; wherein:
in computing a score of a certain word pair, said processor computes the score of the certain word pair based on all alignments of the selected words preceding that word in said first language which forms the certain word pair;
utilize a recurrent neural network having a first input receiving a word selected by said processor and a second input receiving a word in said second language aligned with said word by said word alignment, and
apply the selected word and the word aligned with the word by said word alignment to said first and second inputs, respectively;
wherein said recurrent neural network includes:
an input layer having said first and second inputs, and computing and outputting word embedding vectors from words respectively applied to said first and second inputs,
a hidden layer connected to receive outputs of said input layer for generating, by a predetermined non-linear operation, a vector representing a relation between two outputs from said input layer, and
an output layer computing and outputting said score based on the output of said hidden layer; and
wherein the output of said hidden lever is applied as an input to said hidden layer when a next word pair is given to said word alignment score computing apparatus.

2. A word alignment apparatus for estimating word alignment of bilingual sentence pair of first and second languages, comprising:
the word alignment score computing apparatus according to claim 1;
word alignment candidate generating means for generating a plurality of word alignment candidates for said bilingual sentence pair;
computing means for computing, for each of said plurality of word alignment candidates generated by said word alignment candidate generating means, a word alignment score for said bilingual sentence pair using said word alignment score computing apparatus; and
word alignment determining means for determining and outputting as the word alignment for said bilingual sentence pair, that one of the plurality of word alignment candidates computed by said computing means for said plurality of word alignment candidates which corresponds to the highest score.

3. A computer program stored on a non-transitory computer readable medium causing, when executed by the processor, said processor to function as described in claim 1.

4. A word alignment score computing apparatus for computing a score of word alignment of a bilingual sentence pair of first and second languages, comprising a processor configured to:
responsive to said bilingual sentence pair and a word alignment for the bilingual sentence pair, successively select words of a sentence in said first language of said bilingual sentence pair in a prescribed order; and
compute, for every word of the sentence in said first language of said bilingual sentence pair, a score representing a probability of the selected word and a word in said second language aligned with said word by said word alignment forming a correct word pair, and based on this score, for computing a score of said word alignment; wherein:
in computing a score of a certain word pair, said processor computes the score of the certain word pair based on all alignments of the selected words preceding that word in said first language which forms the certain word pair;
successively select words of the sentence in said first language of said bilingual sentence pair starting from a beginning of the sentence in said first language;
utilize a recurrent neural network having a first input receiving the selected word and a second input receiving a word in said second language aligned with said word by said word alignment, and
apply the selected word and the word aligned with the word by said word alignment to said first and second inputs, respectively;
wherein said recurrent neural network includes:
an input layer having said first and second inputs, and computing and outputting word embedding vectors from words respectively applied to said first and second inputs,
a hidden layer connected to receive outputs of said input layer, for generating, by a predetermined non-linear operation, a vector representing a relation between two outputs from said input layer, and
an output layer computing and outputting said score based on the output of said hidden layer; and
wherein the output of said hidden layer is applied as an input to said hidden layer when a next word pair is given to said word alignment score computing apparatus.

5. A word alignment score computing apparatus for computing a score of word alignment of a bilingual sentence pair of first and second languages, comprising a processor configured to:
responsive to said bilingual sentence pair and a word alignment for the bilingual sentence pair, successively select words of a sentence in said first language of said bilingual sentence pair in a prescribed order; and
compute, for every word of the sentence in said first language of said bilingual sentence pair, a score representing a probability of the selected word and a word in said second language aligned with said word by said word alignment forming a correct word pair, and based on this score, for computing a score of said word alignment; wherein:
in computing a score of a certain word pair, said processor computes the score of the certain word pair based on all alignments of selected words preceding that word in said first language which forms the certain word pair;
compute a score representing a probability of a word pair consisting of the selected word and a word in a sentence in said second language of said bilingual sentence pair aligned with said word by said word alignment being a correct word pair;
compute, based on scores of all words of the sentence in said first language of said bilingual sentence pair, the score of said word alignment;
utilize a recurrent neural network having a first input receiving the selected word and a second input receiving a word in said second language aligned with said word by said word alignment, and apply the selected word and the word aligned with the word by said word alignment to said first and second inputs, respectively;

wherein said recurrent neural network includes:
an input layer having said first and second inputs, and computing and outputting word embedding vectors from words respectively applied to said first and second inputs,
a hidden layer connected to receive outputs of said input layer, for generating, by a predetermined non-linear operation, a vector representing a relation between two outputs from said input layer, and
an output layer computing and outputting said score based on the output of said hidden layer; and
wherein the output of said hidden layer is applied as an input to said hidden layer when a next word pair is given to said word alignment score computing apparatus.

6. A word alignment score computing apparatus for computing a score of word alignment of a bilingual sentence pair of first and second languages comprising a processor configured to,
responsive to said bilingual sentence pair and a word alignment for the bilingual sentence pair, successively select words of a sentence in said first language of said bilingual sentence pair in a prescribed order; and
compute, for every word of the sentence in said first language of said bilingual sentence pair, a score representing a probability or the selected word and a word in said second language aligned with said word by said word alignment forming a correct word pair, and based on this score, for computing a score of said word alignment; wherein:
in computing a score of a certain word pair, said processor computes the score of the certain word pair based on all alignments of the selected words preceding that word in said first language which forms the certain word pair;
compute a score representing a probability of a word pair consisting of the selected word and a word in a sentence in said second language of said bilingual sentence pair aligned with said word by said word alignment being a correct word pair;
compute, based on scores of all words of the sentence in said first language of said bilingual sentence pair computed by said processor, the score of said word alignment;
utilize a recurrent neural network having a first input receiving the selected word and a second input receiving a word in said second language aligned with said word by said word alignment, and
apply the selected word and the word aligned with the word by said word alignment to said first and second inputs, respectively;
compute the score of said word alignment by multiplying the scores of all words of the sentence in said first language of said bilingual sentence pair computed by said processor;

wherein said recurrent neural network includes:
an input layer having said first and second inputs, and computing and outputting word embedding vectors from words respectively applied to said first and second inputs,
a hidden layer connected to receive outputs of said input layer, for generating, by a predetermined non-linear operation, a vector representing a relation between two outputs from said input layer, and
an output layer computing and outputting said score based on the output of said hidden layer; and
wherein the output of said hidden layer is applied as an input to said hidden layer when a next word pair is given to said word alignment score computing apparatus.

7. The word alignment apparatus according to claim 4, wherein the processor is further configured to:
generate a plurality of word alignment candidates for said bilingual sentence pair;
compute, for each of said plurality of generated word alignment candidates, a word alignment score for said bilingual sentence pair using said word alignment score computing apparatus; and
determine and output as the word alignment for said bilingual sentence pair, that one of the computed word alignment candidates for said plurality of word alignment candidates which corresponds to a highest score.

8. The word alignment apparatus according to claim 5, wherein the processor is further configured:
generate a plurality of word alignment candidates for said bilingual sentence pair;
compute, for each of said plurality of generated word alignment candidates, a word alignment score for said bilingual sentence pair using said word alignment score computing apparatus; and
determine and output as the word alignment for said bilingual sentence pair, that one of the computed word alignment candidates for said plurality of word alignment candidates which corresponds to a highest score.

9. The word alignment apparatus according to claim 6, wherein the processor is further configured to:
generate a plurality of word alignment candidates for said bilingual sentence pair;
compute, for each of said plurality of generated word alignment candidates, a word alignment score for said bilingual sentence pair using said word alignment score computing apparatus; and
determine and output as the word alignment for said bilingual sentence pair, that one of the computed word alignment candidates for said plurality of word alignment candidates which corresponds to a highest score.

10. The word alignment apparatus according to claim 1, wherein the processor is further configured to:
generate a plurality of word alignment candidates for said bilingual sentence pair;
compute, for each of said plurality of generated word alignment candidates, a word alignment score for said bilingual sentence pair using said word alignment score computing apparatus; and
determine and output as the word alignment for said bilingual sentence pair, that one of the computed word alignment candidates for said plurality of word alignment candidates which corresponds to a highest score.

11. A computer program stored on a non-transitory computer readable medium causing, when executed by the processor, said processor to function as described in claim 4.

12. A computer program stored on a non-transitory computer readable medium causing, when executed by the processor, said processor to function as described in claim 5.

13. A computer program stored on a non-transitory computer readable medium causing, when executed by the processor, said processor to function as described in claim 6.

14. A computer program stored on a non-transitory computer readable medium causing, when executed by the processor, said processor to function as described in claim 2.

* * * * *